United States Patent [19] [11] Patent Number: 4,946,503
Hattori et al. [45] Date of Patent: Aug. 7, 1990

[54] RUST PREVENTIVE COATING COMPOSITION

[75] Inventors: Tutomu Hattori, Zama; Masashi Ohno, Chigasaki; Shouji Aramaki, Kanagawa, all of Japan

[73] Assignees: Nissan Motor Co., Ltd., Yokohama; Nihon Tokushu Toryo Co., Ltd., Tokyo, both of Japan

[21] Appl. No.: 150,257

[22] Filed: Jan. 29, 1988

[30] Foreign Application Priority Data

Jan. 30, 1987 [JP] Japan .................................. 62-18718

[51] Int. Cl.$^5$ ............................................. C23F 11/00
[52] U.S. Cl. .............................. 106/14.34; 106/14.35; 106/14.36; 524/62
[58] Field of Search ............... 106/14.34, 14.35, 14.36; 524/62

[56] References Cited

U.S. PATENT DOCUMENTS 3,492,231  1/1970  McMillen .............................. 252/33
4,305,855  12/1981 Bretz ...................................... 524/62
4,729,791  3/1988  Laura et al. ......................... 106/14.23

Primary Examiner—Theodore Morris
Attorney, Agent, or Firm—Foley & Lardner, Schwartz, Jeffery, Schwaab, Mack, Blumenthal & Evans

[57] ABSTRACT

A rust preventive coating composition to be applied to the underfloor of an automotive vehicle for the purpose of preventing the underfloor from being rusted. The rust preventive coating composition comprises asphalt, metallic salt of petroleum sulfonic acid, metallic salt of petrolatum oxide, wax-like material, microwax, metallic salt of lanolin fatty acid, metallic salt of synthetic sulfonic acid, plasticizer, solvent, extender pigment, additive, reforming agent and inorganic running preventive agent. The extender pigment includes barium sulfate ranging not less than 20 wt % of the total amount of the extender pigment, and calcium carbonate ranging not less than 5 wt % of the total amount of the extender pigment. The reforming agent ranges from 1 to 10 wt % of the total amount of the rust preventive coating coposition. The inorganic running preventive agnet ranges from 0.5 to 10 wt % of the total amount of the rust preventive coating composition. Additionally, the rust preventive coating composition has a nonvolative content of 70 wt %. This rust preventive coating composition makes it possible to form both relatively thin and thick rust preventive coating films, without using two kinds of conventional coating compositions, exhibiting high performance of rust preventive coating while decreasing the used amount of organic solvent.

15 Claims, No Drawings

RUST PREVENTIVE COATING COMPOSITION

BACKGROUND OF THE INVENTION

1. Field of the Invention

This invention relates to a rust preventive coating composition, and more particularly to the rust preventive coating composition suitable for being applied onto the underfloor of a motor vehicle such as an automotive vehicle.

2. Description of the Prior Art

Hitherto application of rust preventive coating has been extensively carried out for the underfloor of automotive vehicles in order to protect the underfloor from production of rust and corrosion. Examples of the rust preventive coating are so-called underfloor wax having a solid content of about 30 wt%, and so-called bitumen wax having a solid content of about 60 wt%. The underfloor wax consists of 10 wt% of metallic salt of sulfonic acid, 10 wt% of metallic salt of petrolatum oxide, 7 wt% of microcrystalline wax, 7 wt% of paraffin synthetic oil, 0.1 wt% of carbon black and 65.9 wt% of mineral spirit. The bitumen wax consists of 13 wt% of asphalt, 13 wt% of microwax, 10 wt% of metallic salt of sulfonic acid, 8 wt% of metallic salt of lanolin fatty acid, 15 wt% of calcium carbonate and 41 wt% of mineral spirit. The underfloor wax is usually applied onto the underfloor which requires a relatively thin rust preventive film. The bitumen wax is usually applied onto the underfloor which requires a relatively thick rust preventive film.

However, if the underfloor wax is applied thick to form a thick rust preventive film, running of the wax tends to occur during application of the wax, so that it is impossible to form the rust preventive film having a thickness of 300 μm. Additionally, in this case, the underfloor wax is difficult to be dried and therefore is deteriorated in operation efficiency. If the bitumen wax is applied thin to form a thin rust preventive coating film, lack of binding and nonuniformity of the rust preventive film are made thereby to render impossible to form a uniform rust preventive film on the underfloor of the automotive vehicle. Furthermore, the solid contents of the underfloor wax and the bitumen wax cannot be increased to levels of about 30 wt% and about 60 wt%, respectively, from the standpoint of maintaining necessary coating efficiency, and therefore a larger amount of organic solvent (mineral spirit) affecting human body is unavoidably contained in these waxes.

SUMMARY OF THE INVENTION

A rust preventive coating composition of the present invention is comprised of asphalt, metallic salt of petroleum sulfonic acid, metallic salt of petrolatum oxide, wax-like material, microwax, metallic salt of lanolin fatty acid, metallic salt of synthetic sulfonic acid, plasticizer, solvent, extender pigment, additive, reforming agent, and inorganic running preventive agent. In this composition, the extender pigment includes barium sulfate ranging not less than 20 wt% of total amount of the extender pigment, and calcium carbonate ranging not less than 5 wt% of the total amount of the extender pigment. The reforming agent ranges from 1 to 10 wt% of the total amount of the rust preventive coating composition. The inorganic running preventive agent ranges from 0.5 to 10 wt% of the total amount of the rust preventive composition. Additionally, this rust preventive coating composition has a non-volatile content ranging not less than 70 wt%.

This rust preventive coating composition makes it possible to effectively form both a relatively thin rust preventive film without lack of binding and nonuniformity and a relatively thick rust preventive film without running during application. Additionally, the rust preventive coating composition makes it possible to increase the solid content, thereby decreasing the content of organic solvent effecting human body.

DETAILED DESCRIPTION OF THE INVENTION

According to the present invention, a rust preventive coating composition is comprised of asphalt, metallic salt of petroleum sulfonic acid, metallic salt of petrolatum oxide, wax-like material, microwax, metallic salt of lanolin fatty acid, metallic salt of synthetic sulfonic acid, plasticizer, solvent, extender pigment including barium sulfate ranging not less than 20 wt% of total amount of the extender pigment, and calcium carbonate ranging not less than 5 wt% of the total amount of the extender pigment, additive, reforming agent ranging from 1 to 10 wt% of total amount of the rust preventive coating composition, and inorganic running preventive agent ranging from 0.5 to 10 wt% of the total amount of the rust preventive coating composition, the rust preventive coating composition having a non-voltatile content ranging not less than 70 wt%.

As the asphalt of the rust preventive coating composition, straight asphalt and/or blown asphalt is used.

The metallic salt of petroleum sulfonic acid of the rust preventive coating composition corresponds to the salt of alkali metal and/or alkaline earth metal of petroleum sulfonic acid which is a mixture of sulfonic acids of hydrocarbons produced as byproduct during refining of a petroleum fraction with sulfuric acid. More specifically, the metallic salt of petroleum sulfonic acid is prepared, for example, as follows: First white oil is purified with sulfuric acid or solvent to remove sludge. The thus purified white oil is heated together with fuming sulfuric acid to accomplish sulfonation thereby obtaining sulfonic acid mixture of hydrocarbons. After removing unreacted oil and waste acid, the sulfonic acid mixture is purified and neutralized to form the salt of alkali metal and/or alkaline earth metal. Potassium and/or sodium salt is preferably used as the alkali metal salt, and calcium salt and/or barium salt is preferably used as the alkaline earth metal salt.

The metallic salt of petrolatum oxide of the rust preventive coating composition is the salt of alkali metal and/or alkaline earth metal of petrolatum which is obtained by oxidizing paraffin fraction of petroleum. The metallic salt is preferably calcium salt, barium salt and/or sodium salt.

The wax-like material of the rust preventive coating composition is petroleum wax. Paraffin wax, microcrystalline wax and/or petrolatum is preferably used as the wax-like material.

The microwax of the rust preventive coating composition is blended to increase the thixotropy and improve the film production ability of the rust preventive coating composition.

The metallic salt of lanolin fatty acid of the rust preventive coating composition is prepared as follows: Lanolin constituted of ester of higher fatty acid and higher alcohol is decomposed and separated into fatty acid section and alcohol section by saponification decomposition and extraction separation with solvent, thus obtaining lanolin fatty acid. The lanolin fatty acid is then reacted to obtain the metallic salt of lanolin fatty acid. The metallic salt is preferably alkali metal salt, alkaline earth metal salt, aluminium salt, zinc salt or/and the like.

The metallic salt of synthetic sulfonic acid of the rust preventive coating composition is distinct from the above-mentioned metallic salt of petroleum sulfonic acid and prepared by sulfonation of alkylbenzene, alkyl-naphthalene and/or the like obtained under petroleum chemistry. The metallic salt of synthetic sulfonic acid is prepared, for example, by neutralizing sulfonated dinonyl naphthalene with metallic oxide. The metal of the metallic oxide is, for example, barium, lead, sodium, zinc and/or the like.

The plasticizer of the rust preventive composition is phthalic acid ester, dibasic oxide ester, phosphoric ester, polyester plasticizer and/or the like. Of these, dioctyl phthalate (DOP) is preferable for the plasticizer.

The solvent of the rust preventive coating composition is preferably a mixture of aliphatic solvent and aromatic solvent. The aliphatic solvent is, for example, toluene and/or xylene.

The additive of the rust preventive coating composition is colouring agent such as titanium oxide and/or carbon black, thickener or/and the like.

The extender pigment of the rust preventive coating composition includes both barium sulfate and calcium carbonate. The content of the barium sulfate is within a range not less than 20 wt% of the total amount of the extender pigment. The content of the calcium carbonate is within a range not less than 5 wt% of the total amount of the extender pigment. If the content of the barium sulfate is less than 20 wt%, a larger amount of the solvent is necessary so that decreasing effect of used solvent amount is lower. If the content of the calcium carbonate is less than 5 wt% of the total amount of the extender pigment, there is possibility of running of coating when a relatively thick rust preventive film is formed. It is preferable that the content of the barium sulfate is within a range from 20 to 50 wt% of the total amount of the extender pigment, and the content of the calcium carbonate is within a range from 5 to 25 wt% of the total amount of the extender pigment. The extender pigment may additionally include talc, clay, magnesium carbonate and/or the like.

The reforming agent of the rust preventive coating composition is rubber such as SBR, EVA, ordinary temperature drying type alkyd resin, polyurethane resin and/or the like. The reforming agent is blended in an amount ranging from 1 to 10 wt% of the total amount of the rust preventive coating composition in order to improve tipping resistance (resistance against tipping of flying stone) under a thin film condition of the rust preventive coating composition. If the content of the reforming agent is less than 1 wt% of the total amount of the composition, the chipping resistance of the composition is inferior so that the film of the coating composition is liable to peel off upon striking or chipping of stone. If the content of the reforming agent is more than 10 wt% of the total amount of the rust preventive coating composition, coating operation effeciency is deteriorated.

The inorganic running preventive agent of the rust preventive coating composition is, for example, superfine silica which is called aerosil, and blended in an amount ranging from 0.5 to 10 wt% of the total amount of the rust preventive coating composition in order to prevent running or flow of the rust preventive coating composition when applied under a thick film condition. If the content of the running preventive agent is less than 0.5 wt% of the total amount of the coating composition, the running of the coating composition cannot be prevented. If the content of the running preventive agent exceeds 10 wt% of the total amount of the coating composition, coating operation effeciency is deteriorated.

The above-discussed rust preventive coating composition is preferably applied onto the surface of an object by using an airless spray device at a pressure ranging from 75 to 120 kg/cm$^2$. In order to form a relatively thin rust preventive film, the airless spray device having a tip opening diameter less than 25/1000 inch is preferably used. In order to form a relatively thick rust preventive film, the airless spray device having a tip opening diameter not less than 25/1000 inch is preferably used.

EXAMPLES AND COMPARATIVE EXAMPLES

Examples and Comparative Examples will be discussed hereinafter to evaluate the rust preventive coating compositions according to the present invention.

Example 1

A basic wax component was so prepared as to have a composition including 100 parts by weight of microwax, 100 parts (in solid content) by weight of calcium sulfonate as the metallic salt of petroleum sulfonic acid, 50 parts by weight of calcium salt of petrolatum oxide, 20 parts by weight of petrolatum as the wax-like material, 60 parts by weight of asphalt, 80 parts (in solid content) by weight of calcium salt of lanolin fatty acid, 80 parts (in solid content) by weight of calcium salt of synthetic sulfonic acid, and 20 parts by weight of the plasticizer. To the thus prepared basic wax component, 200 parts by weight of barium sulfate, 80 parts by weight of calcium carbonate, 35 parts by weight of the inorganic running preventive agent, 20 parts by weight of the reforming agent, and 210 parts by weight of the solvent were added thereby to obtain the rust preventive coating composition of Example 1.

Example 2

To the basic wax component as same as in Example 1, 170 parts by weight of barium sulfate, 110 parts by weight of calcium carbonate, 35 parts by weight of the inorganic running preventive agent, 20 parts by weight of the reforming agent, and 220 parts by weight of the solvent were blended thereby to obtain the rust preventive coating composition of Example 2.

Example 3

To the basic wax content as same as in Example 1, 200 parts by weight of barium sulfate, 80 parts by weight of calcium carbonate, 80 parts by weight of the inorganic running preventive agent, 20 parts by weight of the reforming agent, and 240 parts by weight of the solvent were blended thereby to obtain the rust preventive coating composition of Example 3.

Example 4

To the basic wax component as same as in Example 1, 200 parts by weight of barium sulfate, 80 parts by weight of calcium carbonate, 35 parts by weight of the inorganic running preventive agent, 80 parts by weight of the reforming agent, and 260 parts by weight of the solvent were blended thereby to obtain the rust preventive coating composition of Example 4.

Comparative Example 1

To the basic wax component as same as in Example 1, 50 parts by weight of barium sulfate, 230 parts by weight of calcium carbonate, 35 parts by weight of the inorganic running preventive agent, 20 parts by weight of the reforming agent, and 380 parts by weight of the solvent were blended thereby to obtain a rust preventive coating composition of Comparative Example 1. This was a case the content of barium sulfate is less than 20 wt% of the total amount of the extender pigment.

Comparative Example 2

To the basic wax component as same as in Example 1, 275 parts by weight of barium sulfate, 10 parts by weight of calcium carbonate, 35 parts by weight of inorganic running preventive agent, 20 parts by weight of the reforming agent, and 210 parts by weight of the solvent were blended thereby to obtain a rust preventive coating composition of Comparative Example 2. This was a case the content of calcium carbonate was less than 5 wt% of the total amount of the extender pigment.

Comparative Example 3

To the basic wax component as same as in Example 1, 200 parts by weight of barium sulfate, 80 parts by weight of calcium carbonate, 3 parts by weight of the inorganic running preventive agent, 20 parts by weight of the reforming agent, and 210 parts by weight of the solvent were blended thereby to obtain a rust preventive coating composition of Comparative Example 3. This was a case the content of the inorganic running preventive agent was less than 0.5 wt% of the total amount of the rust preventive coating composition.

Comparative Example 4

To the basic wax component as same as in Example 1, 200 parts by weight of barium sulfate, 80 parts by weight of calcium carbonate, 125 parts by weight of the inorganic running preventive agent, 20 parts by weight of the reforming agent, and 270 parts by weight of the solvent were blended thereby to obtain a rust preventive coating composition of Comparative Example 4. This was a case the content of the inorganic running preventive agent exceeded 10 wt% of the total amount of the rust preventive coating composition.

Comparative Example 5

To the basic wax component as same as in Example 1, 200 parts by weight of barium sulfate, 80 parts by weight of calcium carbonate, 35 parts by weight of the inorganic running preventive agent, 5 parts by weight of the reforming agent, and 210 parts by weight of the solvent were blended thereby to obtain a rust preventive coating composition of Comparative Example 5. This was a case the content of the reforming agent was less than 1 wt% of the total amount of the rust preventive coating composition.

Comparative Example 6

To the basic wax component as same as in Example 1, 200 parts by weight of barium sulfate, 80 parts by weight of calcium carbonate, 35 parts by weight of the inorganic running preventive agent, 130 parts by weight of the reforming agent, and 300 parts by weight of the solvent were blended thereby to obtain a rust preventive coating composition of Comparative Example 6. This was a case the content of the reforming agent exceeded 10 wt% of the total amount of the rust preventive coating composition.

It is to be noted that in the above-mentioned Examples 1 to 4 and Comparative Examples 1 to 6, the plasticizer was DOP, the inorganic running preventive agent was the aerosil, the reforming agent was EVA, and the solvent was the mixture of isoparaffin (50 parts by weight), toluene (25 parts by weight) and xylene (25 parts by weight).

Next, evaluation of performance of the rust preventive coating compositions of Examples 1 to 4 and Comparative Examples 1 to 6 will be made on the basis of test data or result obtained by evaluation tests discussed hereinafter. The test data or result is shown in Table 1.

Evaluation Tests (1) Coating Performance

Each rust preventive coating composition was sprayed at a pressure of 80 to 110 kg/cm$^2$ to be coated onto the surface of a steel plate (SPCC-SD in Japanese Industrial Standard) having dimensions of 300 mm×300 mm×0.8 mm by using an airless spray (pump) device produced by Gray Company of Japan, Ltd. in Japan. Such spraying was carried out to obtain a thin film (having a thickness of 50 μm) of the rust preventive coating composition, and a thick film (having a thickness of 600 μm) of the rust preventive coating composition. Then, inspection was made for the thin and thick films as to whether there occured tail (exposed part) and lack of binding in the coated film of the rust preventive coating composition coated on the surface of the steel plate.

Evaluation:

A ... No tail and lack of binding occured (Excellent)

B ... Slight tail and lack of binding occured

C ... Tail and lack of binding occured (2) Chipping resistance

The thin and thick films of the rust preventive coating composition were formed on the steel plate in the same manner as in the test of (1) Coating Performance. The films of the rust preventive coating compositions were subjected to the test of Tipping Resistance after being dried at ordinary temperature for 72 hours. The test of Tipping Resistance was conducted as follows: 500 g of crashed stone (No. 6 according to Japanese Industrial Standard) was blasted five times onto the coated film of the rust preventive coating composition on the steel plate, by using a flying stone tester produced by Suga Test Instruments Co., Ltd. in Japan. Then, the area of the coated film being peeled off was measured.

Evaluation:

A ... less than 10% of total area of the coated film

B ... 10 to less than 30% of total area of the coated film

C ... Not less than 30% of total area of the coated film (3) Running Characteristics Each rust preventive coating composition was sprayed and coated on the surface of a SPCC-SD steel plate having dimentions of 300 mm×300 mm×0.8 mm in a condition the steel plate was located vertical and its lower section (100 mm length) as masked to avoid coating, by using the airless spray (pump) device. This coating operation was carried out in such a manner as to form the coated film having a thickness of 1000 μm. Then, after removing the masking, the length of running (flow) of the coated film was measured.

Evaluation:
A ... No running occured
B ... Running of less than 10 mm occured
C ... Running of not less than 10 mm occured (4) Corrosion Resistance Each rust preventive coating composition was sprayed and coated on the surface of a SPCC-SD steel plate having dimensions of 150 mm×100 mm×0.8 mm by an airless spray (pump) device, in such a manner as to form a coated film having a thickness of 50 μm. The thus obtained coated film was subjected to salt spray test. After the salt spray test, the area of rust generated, relative to the total coated area of the coating composition, was measured to inspect rust generation state.

Evaluation:
A ... No rust generated
B ... Less than 10% of the total coated area
C ... Not less than 10% of the total coated area (5) Heating Residue (nonvolatile content)

Each rust preventive coating composition was subjected to a heating residue test (according to K-5400 of Japanese Industrial Standard) in which the coating composition was heated at temperatures of from 105° to 110° C. for 3 hours, and thereafter the percentage of the nonvolatile content (heating residue) in the coating composition was measured.

TABLE 1

| Samples | Coating performance | | Chipping resistance | | Running characteristics | Corrosion resistance | Heating resisdue (%) |
| --- | --- | --- | --- | --- | --- | --- | --- |
| | Thin film | Thick film | Thin film | Thick film | | | |
| Example 1 | A | A | A | A | A | A | 80.4 |
| Example 2 | A | A | A | A | A | A | 79.5 |
| Example 3 | A | A | A | A | A | A | 79.1 |
| Example 4 | A | A | A | A | A | A | 78.1 |
| Comparative Example 1 | A | A | A | A | A | A | 69.3 |
| Comparative Example 2 | A | B | A | A | C | A | 80.4 |
| Comparative Example 3 | A | A | A | A | C | A | 79.6 |
| Comparative Example 4 | C | C | A | A | A | A | 77.8 |
| Comparative Example 5 | A | A | B | A | A | A | 80.0 |
| Comparative Example 6 | C | C | A | A | A | A | 76.0 |

As discussed above, by using the rust preventive coating composition according to the present invention, both relatively thin and thick rust preventive coating films can be effectively formed on the surface of an object such as an automotive vehicle underfloor, without using two kinds of rust preventive coating compositions, exhibiting high performances for the rust preventive coating composition while considerably decreasing the used amount of organic solvent affecting human body.

What is claimed is:

1. A rust preventive coating composition comprising asphalt, metallic salt of petroleum sulfonic acid, metallic salt of petrolatum oxide, petroleum wax, microwax, metallic salt of lanolin fatty acid, metallic salt of synthetic sulfonic acid, plasticizer, solvent, extender pigment including barium sulfate ranging not less than 20 wt% of total amount of said extender pigment, and calcium carbonate ranging not less than 5 wt% of the total amount of said extender pigment, additive, reforming agent ranging from 1 to 10 wt% of total amount of said rust preventive coating composition, said reforming agent being at least one selected from the group consisting of rubber, EVA, alkyd resin and polyurethane resin, and inorganic running preventive agent ranging from 0.5 to 10 wt% of the total amount of said rust preventive coating composition, said rust preventing coating composition having non-volatile content ranging not less than 70 wt%.

2. A rust preventive coating composition as claimed in claim 1, wherein said barium sulfate ranges from 20 to 50 wt% of the total amount of said extender pigment.

3. A rust preventive coating composition as claimed in claim 1, wherein said calcium carbonate ranges from 5 to 25 wt% of the total amount of said extender pigment.

4. A rust preventive coating composition as claimed in claim 1, wherein said asphalt is at least one selected from the group consisting of straight asphalt and brown asphalt.

5. A rust preventive coating composition as claimed in claim 1, wherein said metallic salt of petroleum sulfonic acid includes metallic salts of sulfonic acids of hydrocarbons, in which metallic salt includes one selected from the group consisting of potassium salt, sodium salt, calcium salt and barium salt.

6. A rust preventive coating composition as claimed in claim 1, wherein said metallic salt of petrolatum oxide includes at least one selected from the group consisting of calcium salt, barium salt and sodium salt.

7. A rust preventive coating composition as claimed in claim 1, wherein said wax-like material is at least one selected from the group consisting of paraffin wax, microcrystalline wax and petrolatum.

8. A rust preventive coating composition as claimed in claim 1, wherein said metallic salt of lanolin fatty acid includes at least one selected from the group consisting of alkali metal salt, alkaline earth metal salt, aluminium salt and zinc salt.

9. A rust preventive coating composition as claimed in claim 1, wherein said metallic salt of synthetic sulfonic acid includes at least one selected from the group consisting of barium salt, lead salt, sodium salt and zinc salt.

10. A rust preventive coating composition as claimed in claim 1, wherein said plasticizer is at least one selected from the group consisting of phthalic acid ester, dibasic oxide ester, phosphoric ester and polyester.

11. A rust preventive coating composition as claimed in claim 1, wherein said plasticizer is dioctyl phthalate.

12. A rust preventive coating composition as claimed in claim 1, wherein said solvent is a mixture of aliphatic solvent and aromatic solvent.

13. A rust preventive coating composition as claimed in claim 12, wherein said aliphatic solvent is isoparaffin solvent.

14. A rust preventive coating composition as claimed in claim 12, wherein said aromatic solvent is at least one selected from the group consisting of toluene and xylene.

15. A rust preventive coating composition comprising asphalt, metallic salt of petroleum sulfonic acid, metallic salt of petrolatum oxide, petroleum wax, microwax, metallic salt of lanolin fatty acid, metallic salt of synthetic sulfonic acid, plasticizer, solvent, extender pigment including barium sulfate ranging not less than 20 wt% of total amount of said extender pigment, and calcium carbonate ranging not less than 5 wt% of the total amount of said extender pigment, additive, reforming agent ranging from 1 to 10 wt% of total amount of said rust preventive coating composition, said reforming agent being at least one selected from the group consisting of rubber, EVA, alkyd resin and polyurethane resin, and inorganic running preventive agent ranging rom 0.5 to 10 wt% of the total amount of said rust preventive coating composition, said inorganic running preventive agent being superfine silica, said rust preventing coating composition having non-volatile content ranging not less than 70 wt%.

* * * * *